UNITED STATES PATENT OFFICE.

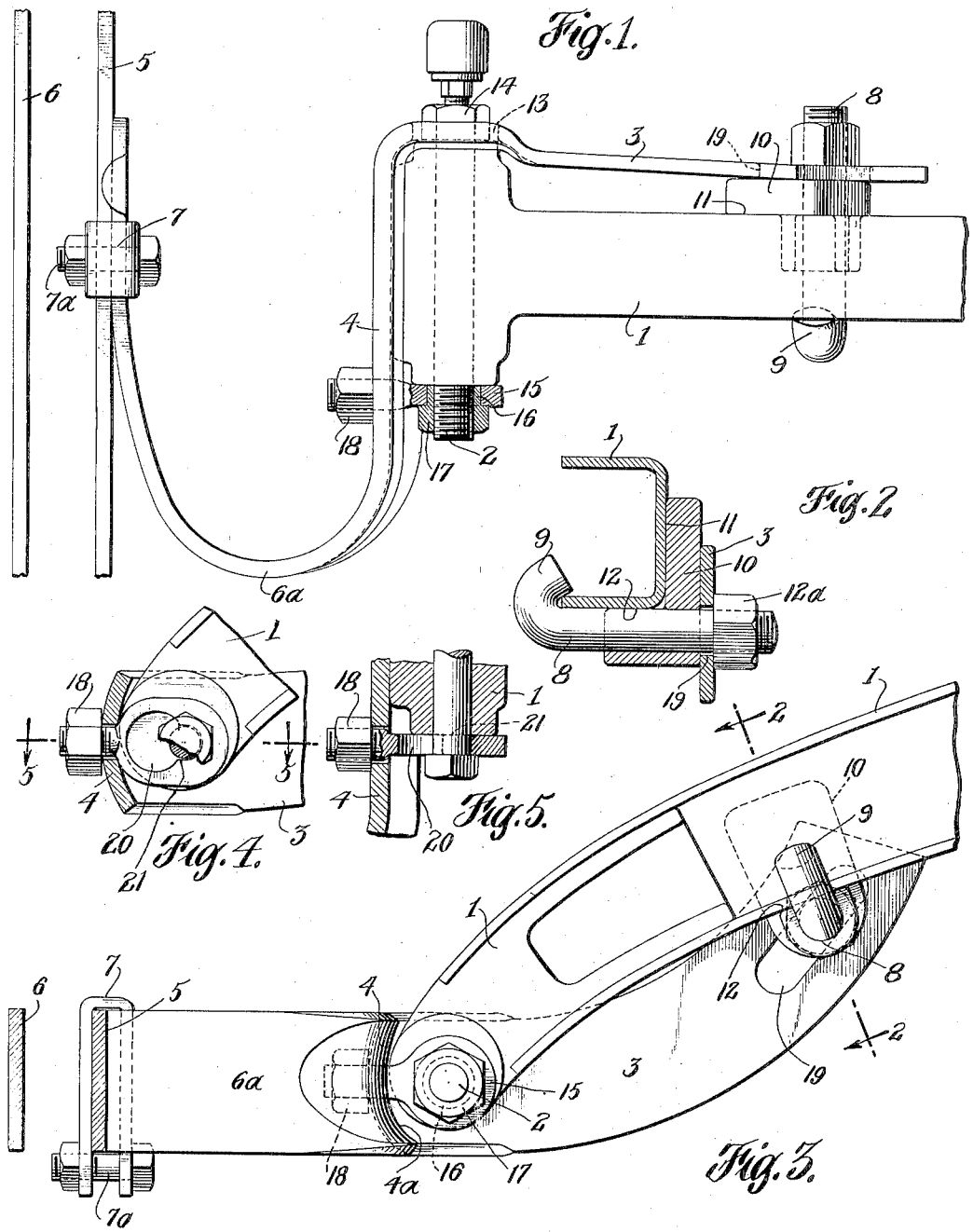

JOHN R. REYBURN, OF FAIRFIELD, CONNECTICUT, ASSIGNOR TO AMERICAN CHAIN COMPANY, INC., A CORPORATION OF NEW YORK.

SUPPORT FOR VEHICLE-BUMPERS.

1,399,520.  Specification of Letters Patent.  Patented Dec. 6, 1921.

Application filed October 6, 1921. Serial No. 505,746.

*To all whom it may concern:*

Be it known that I, JOHN R. REYBURN, a citizen of the United States, residing at Fairfield, in the county of Fairfield, State of Connecticut, have invented certain new and useful Improvements in Supports for Vehicle-Bumpers, of which the following, taken in connection with the accompanying drawings, is a specification.

One of the objects of the invention is the construction of a bumper supporting means of such character that the stresses thereon resulting from any shock to which the bumper is subjected shall be mainly compression stresses.

Another object is the construction of a bumper supporting means characterized by cheapness of construction and relatively few parts.

Another object is the construction of a bumper supporting means in which provision is made for adjustment to different horizontal planes by pivoting the supporting arm at the junction of the frame and the vehicle supporting springs.

Another object is the construction of a bumper support and clamp of such nature that shocks resulting from the impact of collisions or otherwise may be received by the frame directly although the bumper is supported vertically by the attaching means.

Another object is to utilize in buffer attaching means the ordinary spring bolt of the vehicle as a means of support for the bumper.

Another object is to provide a buffer supporting means of such construction that the attachment thereof to the frame of a vehicle will not be hindered or prevented by the presence of splash pans, mud-guards or other parts.

Referring to the drawings:

Figure 1 is a plan view showing the clamping means and supporting arm attached to the frame of an automobile and carrying a bumper of a well known type.

Fig. 2 is a view partly in section on the line 2, 2 of Fig. 3.

Fig. 3 is a side elevation of Fig. 1.

Fig 4 is a detail view of a modification of the invention showing the same adapted for use on cars wherein the head of the spring bolt is on the inner side of the frame as distinguished from the previous figure wherein the head of this bolt is shown on the outer side of the frame.

Fig. 5 is a section on the line 5—5 of Fig. 4.

Referring to the drawings:

The numeral 1 indicates the forward end or "horn" of an automobile channel bar frame member of conventional type provided with the usual spring bolt 2 for pivotal connection with the supporting springs of the car. The supporting arm for the buffer bar may consist of a length of flat strip of steel having a portion 3 adapted to extend along the outer side of the frame as shown in Fig. 1, and a portion 4 extending transversely of the vehicle in abutment with the nose of the frame. Thence the strip may be continued to any suitable form to connect with and carry a buffer bar. In the drawings I have shown a flat stock buffer bar composed of a front member 6 and a rear member 5 with the strip bowed inwardly as shown at $6^a$ and clamped to the rear member 5 by the clip 7 and bolt $7^a$, by which it is rigidly held.

If desired, the portion 4 of the support which passes transversely of and abuts against the nose of the frame may be curved as at $4^a$ transversely and preferably on a little larger radius than that of the said nose to permit of vertical adjustment of the buffer as hereinafter described.

To secure the extreme free end of the supporting arm, there may be provided a bolt 8 having a hook end 9 adapted to hook over an edge of one of the flanges of the channel bar as shown. If it is desired that this hook engage the lower flange of the channel bar, it is unnecessary that there should be any engagement of the tip of the hook with an inner wall on the channel frame.

To steady the support and make it rigid, I may also make use of any suitable spacing means such as the bearing plate 10, which consists of a plate having two surfaces 11 and 12 at right angles to each other whereby the plate is adapted to fit an outer angle on the channel bar. The thickness of the plate will of course vary as the space to be filled varies in different cases. The bolt may pass through a groove in the plate as shown in Fig. 2 and be secured by a nut $12^a$.

At a point intermediate its ends as a means of securing the supporting arm, it is provided with an aperture 13 whereby it is adapted to pass over the bolt head 14 and be drawn up into close contact with the frame as shown, and I may also provide an eye bolt 15, the eye of which is adapted to surround the reduced portion 16 of the nut 17 and the shank of which is adapted to pass through an aperture in the supporting arm and to be secured thereon by the nut 18.

For purposes of adjustment, it is advisable to provide in the buffer bar supporting arm a slot 19. By moving the bolt 8 and plate 10 along the lower flange, adjustment of the buffer bar to various heights may be accomplished. It is obvious that the entire supporting arm may be formed from a strip of stock by simple processes of bending, stamping and punching. Furthermore, the shock of any impact on the buffer bar is transmitted from the supporting arm directly to the frame and not through any of the attaching devices. The latter feature permits of relatively weak construction of the attaching devices, as they are subjected to only a small component of the force of an impact on the buffer bar.

As above stated, the modification shown in Figs. 4 and 5, is adapted for use on cars in which the head of the spring bolt is located on the inner side of the frame as distinguished from those in which the head is located on the outer side of the frame. Since it is extremely inconvenient in applying a bumper support to car to entirely remove the spring bolt, it is desirable that provision be made for applying the bumper without doing so. The eye bolt may be formed with an aperture 20 large enough for the head 21 of the spring bolt to pass through. The aperture 20 may terminate in a slot of suitable dimensions to partially encircle the shank of the spring bolt as shown in Fig. 5. In applying the bumper, the aperture 20 may be passed over the head 21 of the bolt and the stem of the bolt then caused to be seated in the slot by drawing up the bolt itself.

Having thus described my invention, and with the knowledge that changes, variations and modifications may be made which nevertheless come within the scope thereof, I claim:

1. In a support for a buffer for a vehicle provided with a spring bolt for pivoting the supporting springs to the frame, a supporting arm having a portion adapted to extend transversely of and in abutment with the nose of said frame and means adapted to connect said transverse portion and the said spring bolt.

2. In a support for a buffer for a vehicle provided with a spring bolt for pivoting the supporting springs to the frame, a supporting frame having a portion adapted to extend transversely of and in abutment with the nose of said frame and means adapted to connect said transverse portion and the said spring bolt, the connection with said spring bolt being pivotal.

3. In a support for a buffer for a vehicle provided with a spring bolt for pivoting the supporting springs to the frame, a supporting arm having a portion adapted to extend transversely of and in abutment with the nose of said frame and a bolt having an eye adapted for pivotal connection with the said spring bolt and a shank adapted to extend through an aperture in said transverse portion and means for drawing said transverse portion on said shank into abutment with said nose.

4. In a support for a buffer for a vehicle provided with a spring bolt for pivoting the supporting springs to the frame, a supporting arm having a portion adapted to extend transversely of and in abutment with the nose of said frame member and a bolt having at its end means for pivotal connection with said spring bolt and also having a shank adapted to extend through an aperture of said transverse portion and means for drawing said transverse portion on said shank into abutment with said nose.

5. In a support for a buffer for a vehicle provided with a spring bolt for pivoting the supporting springs to the frame, a supporting arm having a portion adapted to extend transversely of and in abutment with the nose of said frame member and a bolt having at its end means for pivotal connection with said spring bolt and also having a shank adapted to extend through an aperture of said transverse portion, means for drawing said transverse portion of said shank into abutment with said nose and means for connecting the free end of said arm to said frame.

6. In a support for a buffer for a vehicle having a spring bolt for pivotal connection of the frame of said vehicle with a supporting spring, a supporting arm having a portion adapted to lie adjacent the side of said frame and another portion adapted to lie transversely of and in abutment with the nose of said frame, said transverse portion being curved in cross section to fit said nose, and means for pivotally connecting said transverse portion to said spring bolt.

7. In a support for a buffer for a vehicle having a spring bolt for pivotal connection of the frame of said vehicle with a supporting spring, a supporting arm having a portion adapted to lie adjacent the side of said frame and another portion adapted to lie transversely of and in abutment with the nose of said frame, said transverse portion being curved in cross section to fit said nose, means for pivotally connecting said transverse portion to said spring bolt and means for connecting the free end of said supporting arm to the said frame.

8. In a support for a buffer for a vehicle having a spring bolt for pivotal connection of the frame of said vehicle with a supporting spring, a supporting arm having a portion adapted to lie adjacent the side of said frame and another portion adapted to lie transversely of and in abutment with the nose of said frame, said transverse portion being curved in cross section to fit said nose, means for pivotally connecting said transverse portion to said spring bolt and means for connecting the free end of said supporting arm to the said frame, said means consisting of a hook bolt adapted to coöperate with the edge of a flange of said frame.

In testimony whereof I have signed this specification.

JOHN R. REYBURN.